(12) United States Patent
Meyer et al.

(10) Patent No.: US 11,930,267 B2
(45) Date of Patent: Mar. 12, 2024

(54) LOCATION SYSTEMS FOR ELECTRONIC DEVICE INTERACTIONS WITH ENVIRONMENT

(71) Applicant: Apple Inc., Cupertino, CA (US)

(72) Inventors: Adam S. Meyer, Cupertino, CA (US); Peter C. Tsoi, San Jose, CA (US); Duncan Robert Kerr, San Francisco, CA (US); Martha Evans Hankey, San Francisco, CA (US); John B. Morrell, Los Gatos, CA (US); James H. Foster, Oxford (GB)

(73) Assignee: Apple Inc., Cupertino, CA (US)

(*) Notice: Subject to any disclaimer, the term of this patent is extended or adjusted under 35 U.S.C. 154(b) by 49 days.

(21) Appl. No.: 17/352,177

(22) Filed: Jun. 18, 2021

(65) Prior Publication Data
US 2021/0314493 A1 Oct. 7, 2021

Related U.S. Application Data

(63) Continuation of application No. 15/696,636, filed on Sep. 6, 2017, now Pat. No. 11,044,405.
(Continued)

(51) Int. Cl.
*H04N 23/63* (2023.01)
*G06F 3/00* (2006.01)
(Continued)

(52) U.S. Cl.
CPC .......... *H04N 23/63* (2023.01); *G06F 3/005* (2013.01); *G06F 3/04817* (2013.01);
(Continued)

(58) Field of Classification Search
None
See application file for complete search history.

(56) References Cited

U.S. PATENT DOCUMENTS

| 8,249,626 B2 | 8/2012 | Huston |
| 8,661,352 B2 | 2/2014 | Gronow et al. |

(Continued)

OTHER PUBLICATIONS

Fuentes-Pacheco, Jorge, et al., "Visual simultaneous localization and mapping: a survey", Spring Science + Business B.V., Dec. 2012, [Retrieved on Sep. 9, 2016], Retrieved from the Internet: <URL: https://www.researchgate.net/publication/234081012>.
(Continued)

*Primary Examiner* — Quan Pham
(74) *Attorney, Agent, or Firm* — Treyz Law Group, P.C.; Kendall P. Woodruff

(57) ABSTRACT

An electronic device may be provided with control circuitry, wireless transceiver circuitry, and a display. The electronic device may be used to provide information to a user in response to being pointed at a particular object. The control circuitry may determine when the electronic device is pointed at a particular object using wireless control circuitry and/or motion sensor circuitry. In response to determining that the electronic device is pointed at a particular object, the control circuitry may take suitable action. This may include, for example, displaying information about an object when the electronic device is pointed at the object, displaying control icons for electronic equipment when the electronic device is pointed at the electronic equipment, and/or displaying a virtual object when the electronic device is pointed at real world object.

16 Claims, 12 Drawing Sheets

Related U.S. Application Data

(60) Provisional application No. 62/395,922, filed on Sep. 16, 2016.

(51) Int. Cl.
 *G06F 3/04817* (2022.01)
 *G06F 3/0488* (2022.01)
 *H04W 4/02* (2018.01)

(52) U.S. Cl.
 CPC .......... *G06F 3/0488* (2013.01); *H04W 4/023* (2013.01); *H04W 4/026* (2013.01)

(56) References Cited

U.S. PATENT DOCUMENTS

| | | |
|---|---|---|
| 8,842,003 B2 | 9/2014 | Huston |
| 9,055,162 B2 | 6/2015 | Park et al. |
| 9,232,353 B2 | 1/2016 | Bozarth et al. |
| 9,372,345 B2 | 6/2016 | Fujimaki |
| 9,600,584 B2 | 3/2017 | Schloter |
| 9,965,048 B2 | 5/2018 | Fujimaki et al. |
| 2004/0121725 A1 | 6/2004 | Matsui |
| 2004/0203931 A1* | 10/2004 | Karaoguz .............. H04L 9/40 455/457 |
| 2007/0055651 A1* | 3/2007 | Yamanaka .............. H04W 4/02 |
| 2009/0319178 A1 | 12/2009 | Khosravy et al. |
| 2011/0216002 A1 | 9/2011 | Weising et al. |
| 2011/0234386 A1 | 9/2011 | Matsuda |
| 2013/0247117 A1 | 9/2013 | Yamada et al. |
| 2015/0279081 A1 | 10/2015 | Monk et al. |
| 2015/0326704 A1 | 11/2015 | Ko et al. |
| 2016/0005229 A1 | 1/2016 | Lee et al. |
| 2016/0072896 A1 | 3/2016 | Petersen et al. |
| 2016/0127868 A1 | 5/2016 | Okuda |
| 2016/0163190 A1 | 6/2016 | Hirabayashi et al. |
| 2016/0274762 A1 | 9/2016 | Lopez et al. |
| 2016/0358459 A1 | 12/2016 | Singhar et al. |
| 2017/0083089 A1 | 3/2017 | Mullins |
| 2017/0213449 A1* | 7/2017 | Tchedikian ............ G08C 17/02 |
| 2017/0228596 A1 | 8/2017 | Wexler et al. |
| 2018/0024362 A1 | 1/2018 | Williamson |
| 2018/0227697 A1 | 8/2018 | Norris et al. |
| 2018/0322774 A1 | 11/2018 | Wang et al. |

OTHER PUBLICATIONS

"Introduction to Real Time Location Systems", DecaWave, Application Note: APS003, 2014. p. 1-14, Dublin, Ireland.

"Sevenhugs Smart Remote: The Remote for Everything", Indiegogo, 25 pages, [Retrieved on Sep. 5, 2017], Retrieved from the Internet: <URL:https://www.indiegogo.com/projects/sevenhugs-smart-remote-the-remote>.

"Ultra-Wideband Location", NIST, Dec. 15, 2009, 3 pages, [Retrieved on Sep. 5, 2017], Retrieved from the Internet: <URL: https://www.nist.gov/programs-projects/ultra-wideband-location>.

* cited by examiner

LOCATION SYSTEMS FOR ELECTRONIC DEVICE INTERACTIONS WITH ENVIRONMENT

This application is a continuation of patent application Ser. No. 15/696,636, filed Sep. 6, 2017, which claims the benefit of provisional patent application No. 62/395,922, filed Sep. 16, 2016, both of which are hereby incorporated by reference herein in their entireties.

BACKGROUND

This relates generally to electronic devices and, more particularly, to wireless electronic devices that use real time location systems to interact with objects in the environment.

Electronic devices often include wireless communications circuitry. For example, cellular telephones, computers, and other devices often contain antennas and wireless transceivers for supporting wireless communications.

Electronic devices are sometimes used to interact with objects in a user's surroundings. For example, an electronic device may be used to provide information about an object that the user is looking at, or an electronic device such as a remote control may be used to control electronic equipment in the user's surroundings. In situations such as these, it can be cumbersome for the user to interact with the surrounding objects and equipment. The electronic device is typically unaware of the object or equipment that the user is interacting with, requiring the user to provide this type of information manually or use a dedicated remote control that is pre-programmed to work with only certain types of electronic equipment.

SUMMARY

An electronic device may be provided with wireless circuitry. The wireless circuitry may include one or more antennas. The antennas may include millimeter wave antenna arrays formed from arrays of millimeter wave antennas on millimeter wave antenna array substrates. The antennas may also include wireless local area network antennas, satellite navigation system antennas, cellular telephone antennas, and other antennas. The antennas may include antennas for supporting ultra-wideband communications.

The electronic device may be provided with control circuitry and a display. The electronic device may be used to provide information to a user in response to being pointed at a particular object. The control circuitry may determine when the electronic device is pointed at a particular object using wireless control circuitry and/or motion sensor circuitry. In response to determining that the electronic device is pointed at a particular object, the control circuitry may take suitable action. This may include, for example, displaying information about an object when the electronic device is pointed at the object, displaying control icons for electronic equipment when the electronic device is pointed at the electronic equipment, and/or displaying a virtual object when the electronic device is pointed at a real world object.

DETAILED DESCRIPTION

In some wireless systems, the services that are provided may depend on the position of one node relative to another node in the network. Consider a scenario in which a user of an electronic device wishes to perform certain tasks when the user points the electronic device at a particular object. For example, a user may wish to use his or her electronic device as a way of querying an object for information, as a way of controlling another electronic device, or as a way of viewing virtual objects that are overlaid onto real world images. In all of these applications, the electronic device may need to determine where other objects are located and how the electronic device is oriented relative to those objects.

Figure 1:
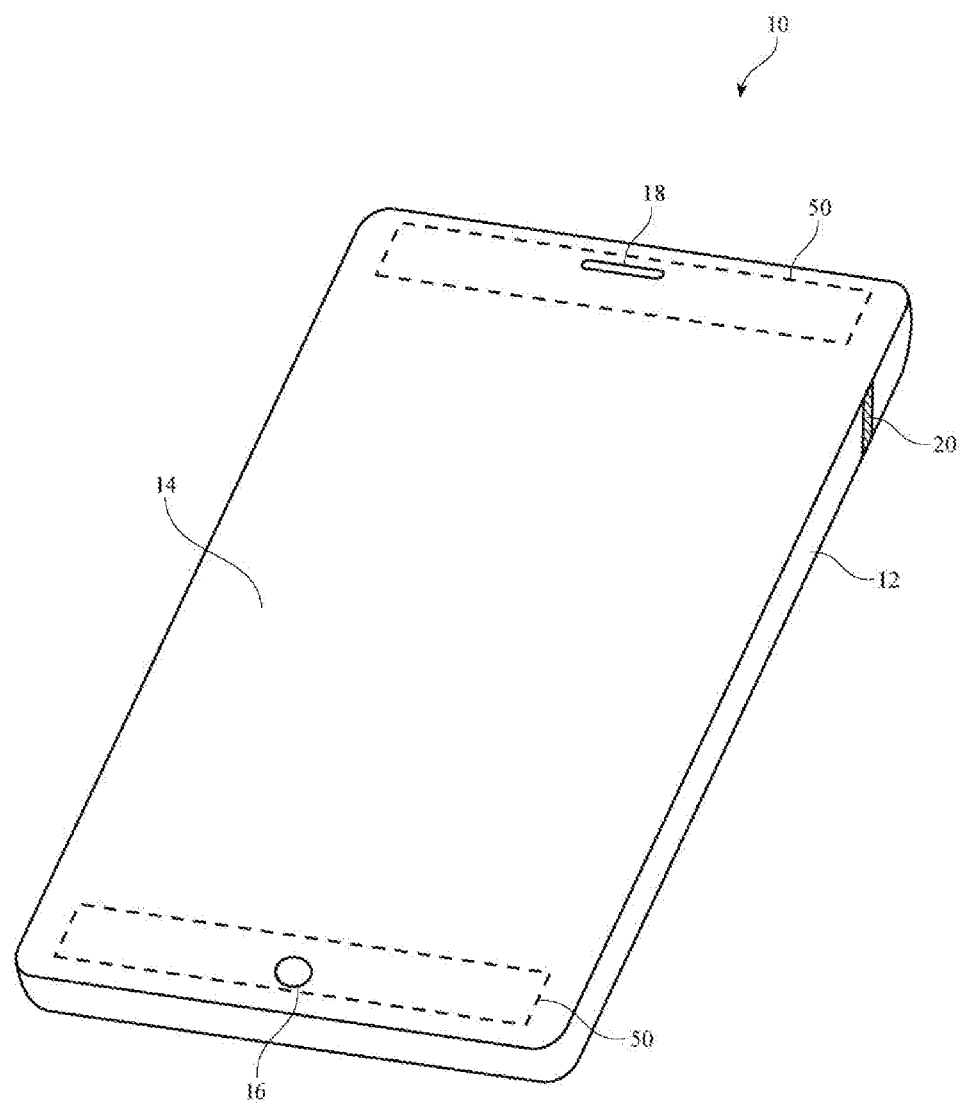
FIG. 1 is a perspective view of an illustrative electronic device with wireless communications circuitry and sensors in accordance with an embodiment.

An electronic device such as electronic device 10 of FIG. 1 may have control circuitry that determines where other objects or devices (sometimes referred to as nodes) are located relative to electronic device 10. The control circuitry in device 10 may synthesize information from cameras, motion sensors, wireless circuitry such as antennas, and other input-output circuitry to determine how far a node is relative to device 10 and to determine the orientation of device 10 relative to that node. The control circuitry may use output components in device 10 to provide output (e.g., display output, audio output, haptic output, or other suitable output) to a user of device 10 based on the position of the node.

Antennas in device 10 may include cellular telephone antennas, wireless local area network antennas (e.g., WiFi® antennas at 2.4 GHz and 5 GHz and other suitable wireless local area network antennas), satellite navigation system signals, and near-field communications antennas. The antennas may also include antennas for handling millimeter wave communications. For example, the antennas may include millimeter wave phased antenna arrays. Millimeter wave communications, which are sometimes referred to as extremely high frequency (EHF) communications, involve signals at 60 GHz or other frequencies between about GHz and 400 GHz.

Wireless circuitry in device 10 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

As shown in FIG. 1, device 10 may include a display such as display 14. Display 14 may be mounted in a housing such as housing 12. For example, device 10 may have opposing front and rear faces and display 14 may be mounted in housing 12 so that display 14 covers the front face of device 10 as shown in FIG. 1. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). If desired, different portions of housing 12 may be formed from different materials. For example, housing sidewalls may be formed from metal and some or all of the rear wall of housing 12 may be formed from a dielectric such as plastic, glass, ceramic, sapphire, etc. Dielectric rear housing wall materials such as these may, if desired, by laminated with metal plates and/or other metal structures to enhance the strength of the rear housing wall (as an example).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels formed from liquid crystal display (LCD) components, an array of electrophoretic pixels, an array of plasma pixels, an array of organic light-emitting diode pixels, an array of electrowetting pixels, or pixels based on other display technologies.

Display 14 may be protected using a display cover layer such as a layer of transparent glass, clear plastic, sapphire, or other transparent dielectric. Openings may be formed in the display cover layer. For example, an opening may be formed in the display cover layer to accommodate a button such as button 16. Buttons such as button 16 may also be formed from capacitive touch sensors, light-based touch sensors, or other structures that can operate through the display cover layer without forming an opening.

If desired, an opening may be formed in the display cover layer to accommodate a port such as speaker port 18. Openings may be formed in housing 12 to form communications ports (e.g., an audio jack port, a digital data port, etc.). Openings in housing 12 may also be formed for audio components such as a speaker and/or a microphone. Dielectric-filled openings 20 such as plastic-filled openings may be formed in metal portions of housing 12 such as in metal sidewall structures (e.g., to serve as antenna windows and/or to serve as gaps that separate portions of antennas from each other).

Antennas may be mounted in housing 12. If desired, some of the antennas (e.g., antenna arrays that may implement beam steering, etc.) may be mounted under dielectric portions of device 10 (e.g., portions of the display cover layer, portions of a plastic antenna window in a metal housing sidewall portion of housing 12, etc.). With one illustrative configuration, some or all of rear face of device 12 may be formed from a dielectric. For example, the rear wall of housing 12 may be formed from glass plastic, ceramic, other dielectric. In this type of arrangement, antennas may be mounted within the interior of device 10 in a location that allows the antennas to transmit and receive antenna signals through the rear wall of device 10 (and, if desired, through optional dielectric sidewall portions in housing 12). Antennas may also be formed from metal sidewall structures in housing 12 and may be located in peripheral portions of device 10.

To avoid disrupting communications when an external object such as a human hand or other body part of a user blocks one or more antennas, antennas may be mounted at multiple locations in housing 12. Sensor data such as proximity sensor data, real-time antenna impedance measurements, signal quality measurements such as received signal strength information, and other data may be used in determining when one or more antennas is being adversely affected due to the orientation of housing 12, blockage by a user's hand or other external object, or other environmental factors. Device 10 can then switch one or more replacement antennas into use in place of the antennas that are being adversely affected.

Antennas may be mounted at the corners of housing, along the peripheral edges of housing 12, on the rear of housing 12, under the display cover layer that is used in covering and protecting display 14 on the front of device 10 (e.g., a glass cover layer, a sapphire cover layer, a plastic cover layer, other dielectric cover layer structures, etc.), under a dielectric window on a rear face of housing 12 or the edge of housing 12, under a dielectric rear wall of housing 12, or elsewhere in device 10. As an example, antennas may be mounted at one or both ends 50 of device 10 (e.g., along the upper and lower edges of housing 12, at the corners of housing 12, etc.).

Figure 2:
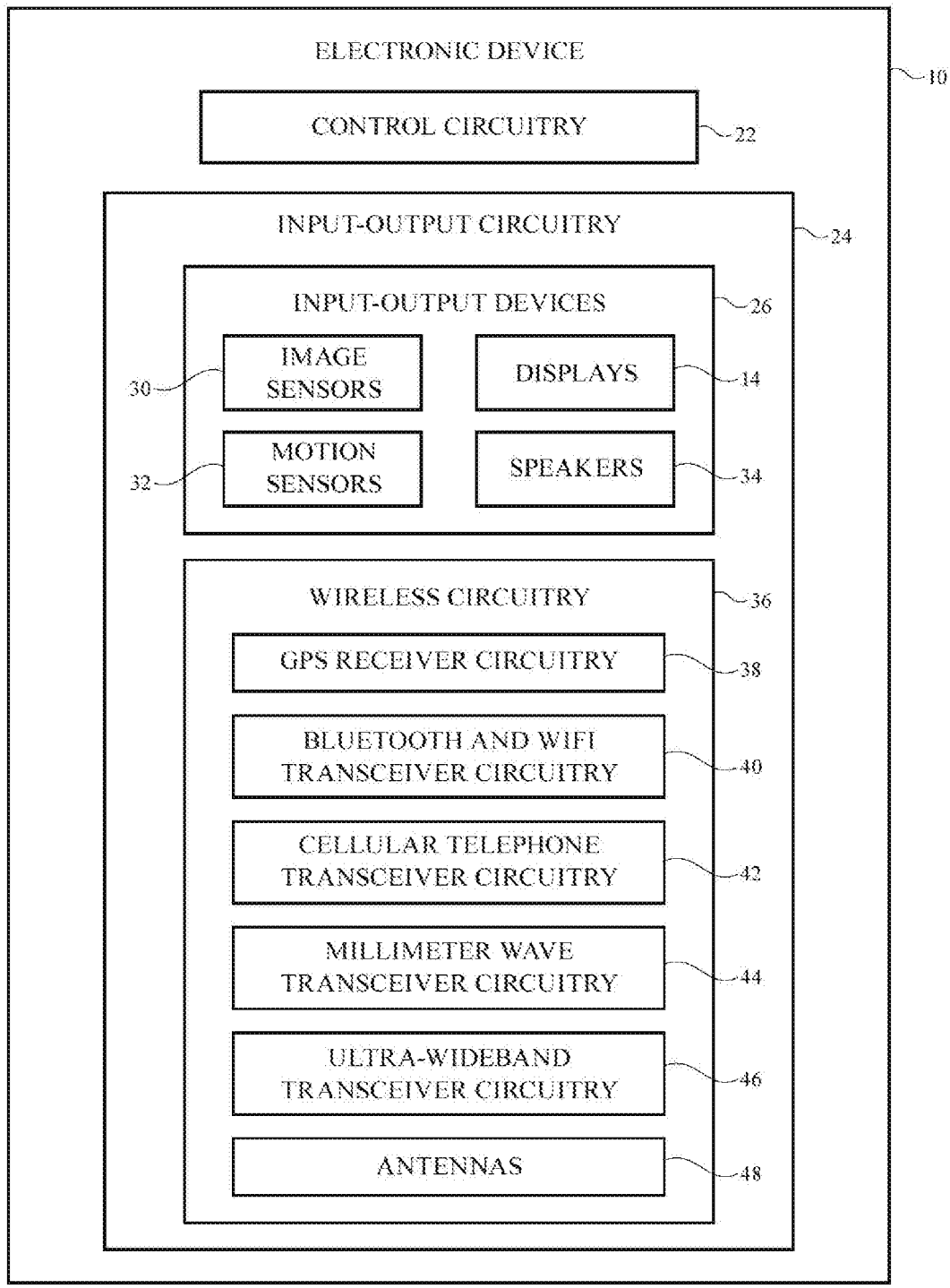
FIG. 2 is a schematic diagram of an illustrative electronic device with wireless communications circuitry and sensors in accordance with an embodiment.

A schematic diagram of illustrative components that may be used in device 10 is shown in FIG. 2. As shown in FIG. 2, device 10 may include storage and processing circuitry such as control circuitry 22. Control circuitry 22 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 22 may be used to control the operation of device 10. This processing circuitry may be based on one or more microprocessors, microcontrollers, digital signal processors, baseband processor integrated circuits, application specific integrated circuits, etc.

Control circuitry 22 may be used to run software on device 10, such as internet browsing applications, voice-over-internet-protocol (VOIP) telephone call applications, email applications, media playback applications, operating system functions, etc. To support interactions with external equipment, control circuitry 22 may be used in implementing communications protocols. Communications protocols that may be implemented using control circuitry 22 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, millimeter wave communications protocols, IEEE 802.15.4 ultra-wideband communications protocols, etc.

Device 10 may include input-output circuitry 24. Input-output circuitry 24 may include input-output devices 26. Input-output devices 26 may be used to allow data to be supplied to device 10 and to allow data to be provided from device 10 to external devices. Input-output devices 26 may include user interface devices, data port devices, and other input-output components. For example, input-output devices 26 may include one or more displays 14 (e.g., touch screens or displays without touch sensor capabilities), one or more image sensors 30 (e.g., digital image sensors), motion sensors 32, and speakers 34. Input-output devices 26 may also include buttons, joysticks, scrolling wheels, touch pads, key pads, keyboards, microphones, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Image sensors 30 may include one or more visible digital image sensors (visible-light cameras) and/or one or more infrared digital image sensors (infrared-light cameras).

Image sensors 30 may, if desired, be used to measure distances. For example, an infrared time-of-flight image sensor may be used to measure the time that it takes for an infrared light pulse to reflect back from objects in the vicinity of device 10, which may in turn be used to determine the distance to those objects. Visible imaging systems such as a front and/or rear facing camera in device 10 may also be used to determine the position of objects in the environment. For example, control circuitry 22 may use image sensors 30 to perform simultaneous localization and mapping (SLAM). SLAM refers to the process of using images to determine the position of objections in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 22 may rely entirely upon image sensors 30 to perform simultaneous localization and mapping, or control circuitry 22 may synthesize image data with range data from one or more distance sensors (e.g., light-based proximity sensors). If desired, control circuitry 22 may use display 14 to display a visual representation of the mapped environment.

Motion sensors 32 may include accelerometers, gyroscopes, magnetic sensors (e.g., compasses), and other sensor structures. Sensors 32 of FIG. 2 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Motion sensors 32 may include circuitry for detecting movement and orientation of device 10. Motion sensors that may be used in sensors 32 include accelerometers (e.g., accelerometers that measure acceleration along one, two, or three axes), gyroscopes, compasses, pressure sensors, other suitable types of motion sensors, etc. Storage and processing circuitry 22 may be used to store and process motion sensor data. If desired, motion sensors, processing circuitry, and storage that form motion sensor circuitry may form part of a system-on-chip integrated circuit (as an example).

Other sensors that may be included in input-output devices 26 include ambient light sensors for gathering information on ambient light levels, proximity sensor components (e.g., light-based proximity sensors, capacitive proximity sensors, and/or proximity sensors based on other structures).

Input-output circuitry 24 may include wireless communications circuitry 36 for communicating wirelessly with external equipment. Wireless communications circuitry 36 may include radio-frequency (RF) transceiver circuitry formed from one or more integrated circuits, power amplifier circuitry, low-noise input amplifiers, passive RF components, one or more antennas 48, transmission lines, and other circuitry for handling RF wireless signals. Wireless signals can also be sent using light (e.g., using infrared communications).

Wireless communications circuitry 36 may include radio-frequency transceiver circuitry for handling various radio-frequency communications bands. For example, circuitry 36 may include transceiver circuitry 40, 42, 44, and 46.

Transceiver circuitry 40 may be wireless local area network transceiver circuitry. Transceiver circuitry 40 may handle 2.4 GHz and 5 GHz bands for WiFi® (IEEE 802.11) communications and may handle the 2.4 GHz Bluetooth® communications band.

Circuitry 36 may use cellular telephone transceiver circuitry 42 for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry 42 may handle voice data and non-voice data.

Millimeter wave transceiver circuitry 44 (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry 44 may support IEEE 802.11ad communications at 60 GHz. Circuitry 44 may be formed from one or more integrated circuits (e.g., multiple integrated circuits mounted on a common printed circuit in a system-in-package device, one or more integrated circuits mounted on different substrates, etc.).

Ultra-wideband transceiver circuitry 46 may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry 46 may operate in a 2.4 GHz frequency band and/or at other suitable frequencies.

Wireless communications circuitry 36 may include satellite navigation system circuitry such as Global Positioning System (GPS) receiver circuitry 38 for receiving GPS signals at 1575 MHz or for handling other satellite positioning data (e.g., GLONASS signals at 1609 MHz). Satellite navigation system signals for receiver 38 are received from a constellation of satellites orbiting the earth.

In satellite navigation system links, cellular telephone links, and other long-range links, wireless signals are typically used to convey data over thousands of feet or miles. In WiFi® and Bluetooth® links at 2.4 and 5 GHz and other short-range wireless links, wireless signals are typically used to convey data over tens or hundreds of feet. Extremely high frequency (EHF) wireless transceiver circuitry 44 may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 10 can be switched out of use and higher-performing antennas used in their place.

Wireless communications circuitry 36 can include circuitry for other short-range and long-range wireless links if desired. For example, wireless communications circuitry 36 may include circuitry for receiving television and radio signals, paging system transceivers, near field communications (NFC) circuitry, etc.

Antennas 48 in wireless communications circuitry 36 may be formed using any suitable antenna types. For example, antennas 48 may include antennas with resonating elements that are formed from loop antenna structures, patch antenna structures, inverted-F antenna structures, slot antenna structures, planar inverted-F antenna structures, monopoles, dipoles, helical antenna structures, Yagi (Yagi-Uda) antenna structures, hybrids of these designs, etc. If desired, one or more of antennas 48 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 48 can be configured to receive both satellite navigation system signals and signals for other communications bands (e.g., wireless local area network signals and/or cellular telephone signals). Antennas 48 can include phased antenna arrays for handling millimeter wave communications.

In configurations for device 10 in which housing 12 has portions formed from metal, openings may be formed in the metal portions to accommodate antennas 48. For example, openings in a metal housing wall may be used in forming splits (gaps) between resonating element structures and ground structures in cellular telephone antennas. These openings may be filled with a dielectric such as plastic. As shown in FIG. 1, for example, a portion of plastic-filled opening 20 may run up one or more of the sidewalls of housing 12.

Figure 3:
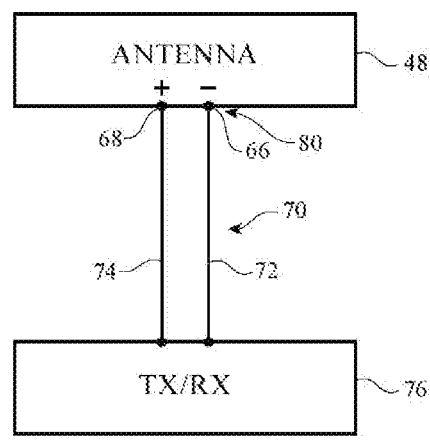
FIG. 3 is a diagram of an illustrative transceiver circuit and antenna in accordance with an embodiment.

A schematic diagram of a millimeter wave antenna or other antenna 48 coupled to transceiver circuitry 76 (e.g., wireless local area network transceiver circuitry 40, cellular telephone transceiver circuitry 42, millimeter wave transceiver circuitry 44, ultra-wideband transceiver circuitry 46, and/or other transceiver circuitry in wireless circuitry 36) is shown in FIG. 3. As shown in FIG. 3, radio-frequency transceiver circuitry 76 may be coupled to antenna feed 80 of antenna 48 using transmission line 70. Antenna feed 80 may include a positive antenna feed terminal such as positive antenna feed terminal 68 and may have a ground antenna feed terminal such as ground antenna feed terminal 66. Transmission line 70 may be formed from metal traces on a printed circuit or other conductive structures and may have a positive transmission line signal path such as path 74 that is coupled to terminal 68 and a ground transmission line signal path such as path 72 that is coupled to terminal 66. Transmission line paths such as path 70 may be used to route antenna signals within device 10. For example, transmission line paths may be used to couple antenna structures such as one or more antennas in an array of antennas to transceiver circuitry 76. Transmission lines in device 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within transmission line 70 and/or circuits such as these may be incorporated into antenna 48 (e.g., to support antenna tuning, to support operation in desired frequency bands, etc.).

If desired, signals for millimeter wave antennas may be distributed within device 10 using intermediate frequencies (e.g., frequencies of about 5-15 GHz rather than 60 Hz). The intermediate frequency signals may, for example, be distributed from a baseband processor or other wireless communications circuit located near the middle of device 10 to one or more arrays of millimeter wave antennas at the corners of device 10. At each corner, upconverter and downconverter circuitry may be coupled to the intermediate frequency path. The upconverter circuitry may convert received intermediate frequency signals from the baseband processor to millimeter wave signals (e.g., signals at 60 GHz) for transmission by a millimeter wave antenna array. The downconverter circuitry may downconvert millimeter wave antenna signals from the millimeter wave antenna array to intermediate frequency signals that are then conveyed to the baseband processor over the intermediate frequency path.

Device 10 may contain multiple antennas 48. The antennas may be used together or one of the antennas may be switched into use while other antenna(s) are switched out of use. If desired, control circuitry 22 may be used to select an optimum antenna to use in device 10 in real time and/or to select an optimum setting for adjustable wireless circuitry associated with one or more of antennas 48. Antenna adjustments may be made to tune antennas to perform in desired frequency ranges, to perform beam steering with a phased antenna array, and to otherwise optimize antenna performance. Sensors may be incorporated into antennas 48 to gather sensor data in real time that is used in adjusting antennas 48.

In some configurations, antennas 48 may include antenna arrays (e.g., phased antenna arrays to implement beam steering functions). For example, the antennas that are used in handling millimeter wave signals for extremely high frequency wireless transceiver circuits 44 may be implemented as phased antenna arrays. The radiating elements in a phased antenna array for supporting millimeter wave communications may be patch antennas, dipole antennas, dipole antennas with directors and reflectors in addition to dipole antenna resonating elements (sometimes referred to as Yagi antennas or beam antennas), or other suitable antenna elements. Transceiver circuitry can be integrated with the phased antenna arrays to form integrated phased antenna array and transceiver circuit modules.

Figure 4:
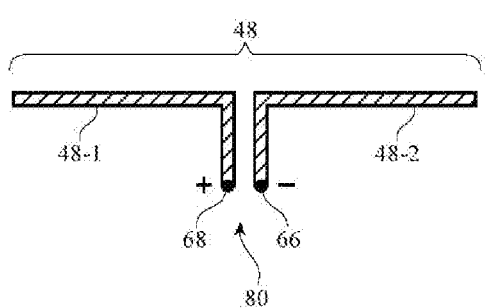
FIG. 4 is a diagram of an illustrative dipole antenna in accordance with an embodiment.

An illustrative dipole antenna is shown in FIG. 4. As shown in FIG. 4, dipole antenna 48 may have first and second arms such as arms 48-1 and 48-2 and may be fed at antenna feed 80. If desired, a dipole antenna such as dipole antenna 48 of FIG. 4 may be incorporated into a Yagi antenna (e.g., by incorporating a reflector and directors into dipole antenna 48 of FIG. 4).

Figure 5:
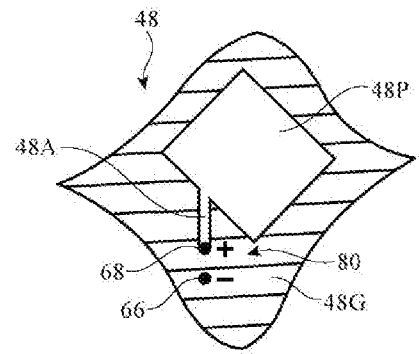
FIG. 5 is a perspective view of an illustrative patch antenna that may be used in an electronic device in accordance with an embodiment.

An illustrative patch antenna is shown in FIG. 5. As shown in FIG. 5, patch antenna 48 may have a patch antenna resonating element 48P that is separated from and parallel to a ground plane such as antenna ground plane 48G. Arm 48A may be coupled between patch antenna resonating element 48P and positive antenna feed terminal 68 of antenna feed 80. Ground antenna feed terminal 66 of feed 80 may be coupled to ground plane 48G.

Antennas of the types shown in FIGS. 4 and 5 and/or other antennas 48 may be used in forming millimeter wave antennas. The examples of FIGS. 4 and 5 are merely illustrative.

Figure 6:
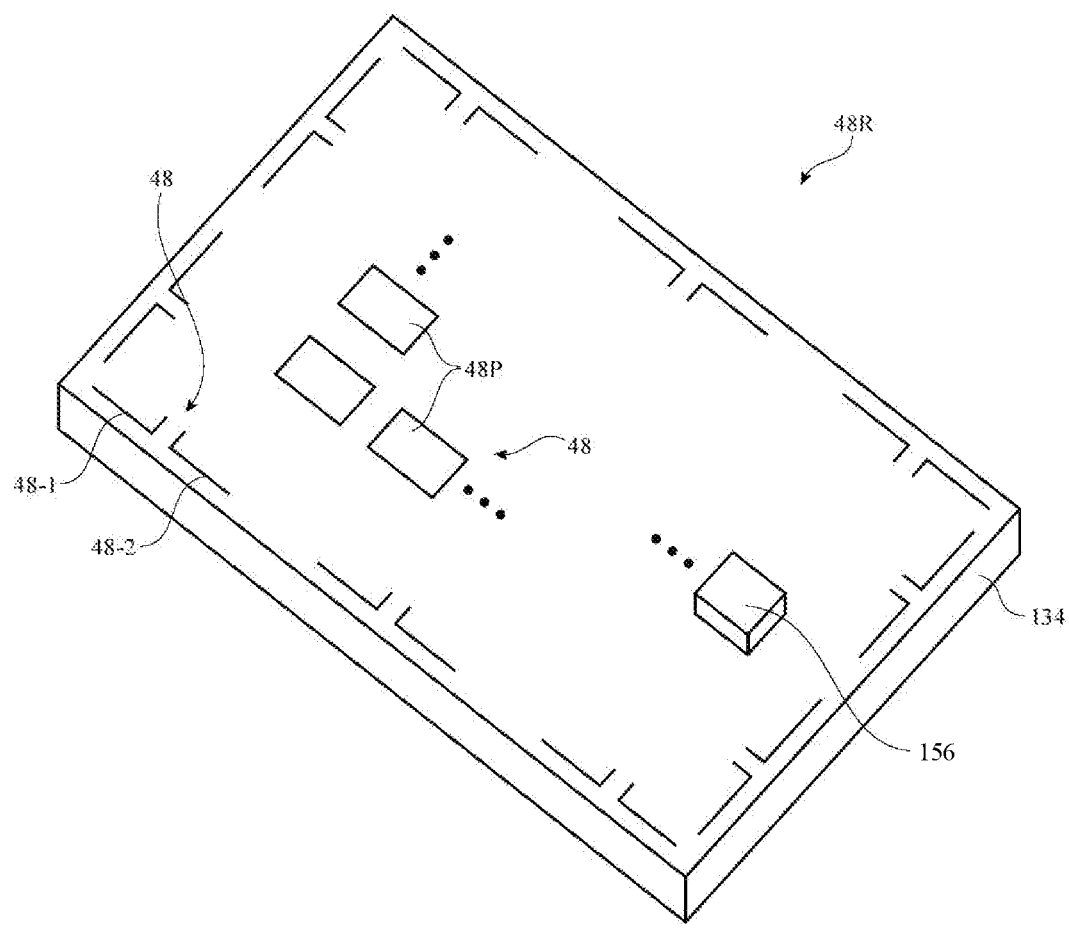
FIG. 6 is a perspective view of an illustrative array of millimeter wave antennas on a millimeter wave antenna array substrate in accordance with an embodiment.

FIG. 6 is a perspective view of an illustrative millimeter wave antenna array 48R formed from antenna resonating elements on millimeter wave antenna array substrate 134. Array 48R may include an array of millimeter wave antennas such as patch antennas 48 formed from patch antenna resonating elements 48P and dipole antennas 48 formed from arms 48-1 and 48-2. With one illustrative configuration, dipole antennas 48 may be formed around the periphery of substrate 134 and patch antennas 48 may form an array on the central surface of substrate 134. There may be any suitable number of millimeter wave antennas 48 in array 48R. For example, there may be 10-40, 32, more than 5, more than 10, more than 20, more than 30, fewer than 50, or other suitable number of millimeter wave antennas (patch antennas and/or dipole antennas, etc.). Substrate 134 may be formed from one or more layers of dielectric (polymer, ceramic, etc.) and may include patterned metal traces for forming millimeter wave antennas and signal paths. The signals paths may couple the millimeter wave antennas to circuitry such as one or more electrical devices 156 mounted on substrate 134. Device(s) 156 may include one or more integrated circuits, discrete components, upconverter circuitry, downconverter circuitry, (e.g., upconverter and downconverter circuitry that forms part of a transceiver), circuitry for adjusting signal amplitude and/or phase to perform beam steering, and/or other circuitry for operating antenna array 48R.

Figure 7:
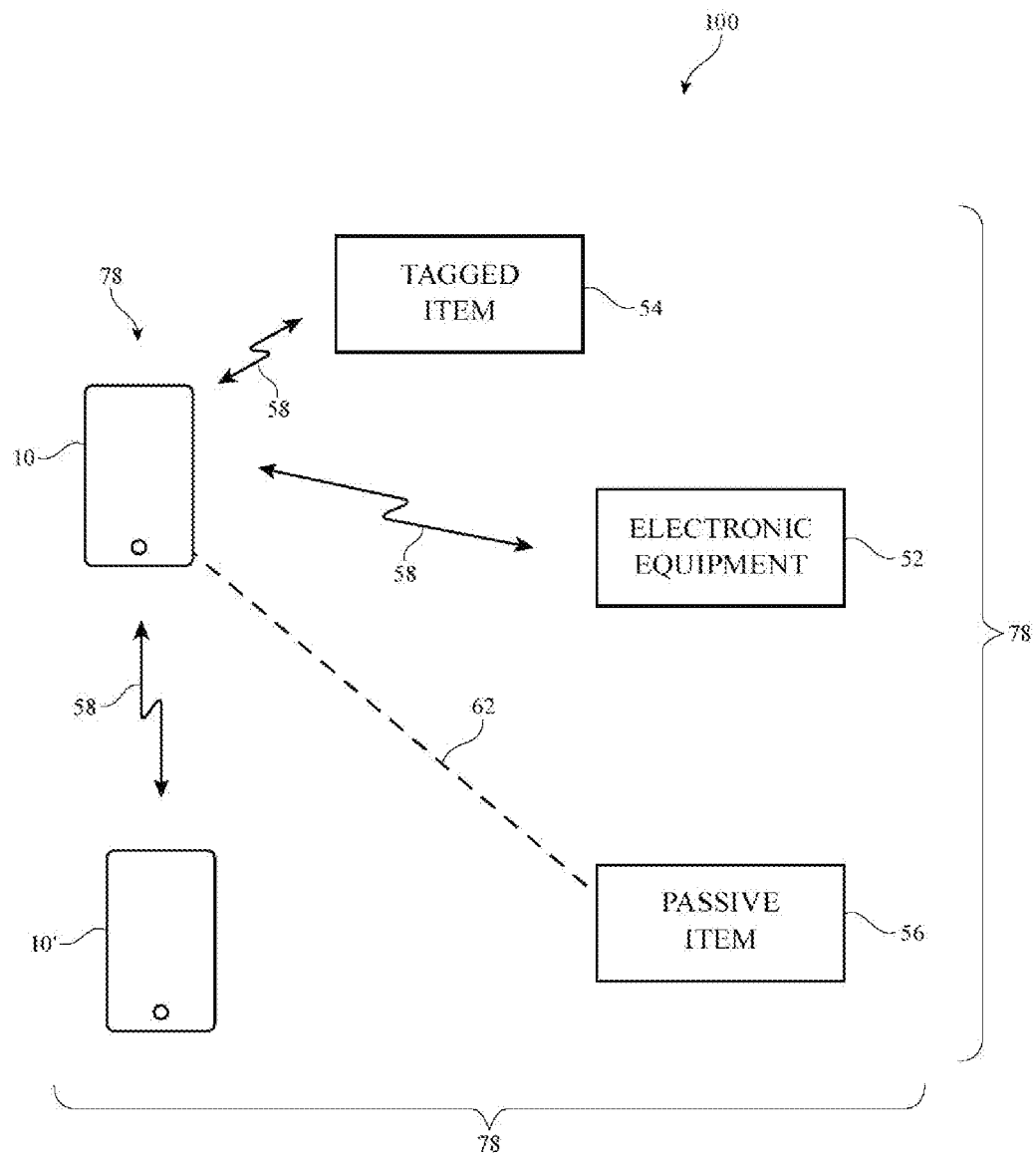
FIG. 7 is a diagram of an illustrative network having nodes in accordance with an embodiment.

FIG. 7 is a diagram of an illustrative network of objects that electronic device 10 may recognize and/or communicate wirelessly with. Network 100 may include nodes 78. Nodes 78 may be passive or active. Active nodes in network 100 may include devices that are capable of receiving and/or transmitting wireless signals such as signals 58. Active nodes in network 100 may include tagged devices such as tagged item 54, electronic equipment such as electronic equipment 52, and other electronic devices such as electronic devices 10' (e.g., devices having some or all of the same wireless communications capabilities as device 10). Tagged item 54 may be any suitable object that has been provided with a wireless receiver and/or a wireless transmitter. For example, tagged device 54 may be a key fob, a cellular telephone, a wallet, a laptop, a book, a pen, or other object that has been provided with a low-power transmitter (e.g., an RFID transmitter or other transmitter). Device 10 may have a corresponding receiver that detects the transmitted signals 58 from device 54 and determines the location of device 54 based on the received signals. Tagged device 54 may be passive (e.g., may not include an internal power source and may instead be powered by electromagnetic energy from device 10 or other device) or may be active (e.g., may include an internal power source).

Electronic equipment 52 may be an infrastructure-related device such as a thermostat, a smoke detector, a Bluetooth® Low Energy (Bluetooth LE) beacon, a WiFi® wireless access point, a server, a heating, ventilation, and air conditioning (HVAC) system (sometimes referred to as a temperature-control system), a light source such as a light-emitting diode (LED) bulb, a light switch, a power outlet, an occupancy detector (e.g., an active or passive infrared light detector, a microwave detector, etc.), a door sensor, a moisture sensor, an electronic door lock, a security camera, or other device.

Device 10 may communicate with nodes 54, 52, and 10' using communications signals 58. Communications signals 58 may include Bluetooth® signals, near-field communications signals, wireless local area signals such as IEEE 802.11 signals, millimeter wave communication signals such as signals at 60 GHz, ultra-wideband radio frequency signals, other radio-frequency wireless signals, infrared signals, etc. Wireless signals 58 may be used to convey information such as location and orientation information. For example, control circuitry 22 in device 10 may determine the location of active nodes 54, 52, and 10' relative to device 10 using wireless signals 58. Control circuitry 22 may also use image data from image sensors 30, motion sensor data from motion sensors 32, and other sensor data (e.g., proximity data from a proximity sensor, etc.) to determine the location of active nodes 54, 52, and 10'.

Passive nodes in network 100 such as passive object 56 may include objects that do not emit or receive radio-frequency signals such as furniture, buildings, doors, windows, walls, people, pets, and other items. Item 56 may be a tagged item that device 10 recognizes through feature tracking (e.g., using image sensor 30) or item 56 may be a virtually marked space that device 10 has assigned a set of coordinates to. For example, control circuitry 22 may construct a virtual three-dimensional space and may assign objects in the vicinity of device 10 coordinates in the virtual three-dimensional space based on their locations relative to device 10. In some arrangements, the virtual three-dimensional space may be anchored by one or more items with a known location (e.g., may be anchored by one or more tagged items 54 having a known location, electronic equipment 52 having a known location, or other items with a known location). Device 10 may then "tag" passive items such as item 56 by recording where passive item 56 is located relative to the anchored items in network 100. Device 10 may remember the virtual coordinates of passive item 56 and may take certain actions when device 10 is in a certain location or orientation relative to item 56. For example, if a user points device 10 in direction 62, control circuitry 10 may recognize that device 10 is being pointed at item 56 and may take certain actions (e.g., may display information associated with item 56 on display 14, may provide audio output via speakers 34, may provide haptic output via a vibrator in device 10, and/or may take other suitable action). Because passive item 56 does not send or receive communication signals, circuitry 22 may use image data from image sensors 30, motion sensor data from motion sensors 32, and other sensor data (e.g., proximity data from a proximity sensor, etc.) to determine the location of passive item 56 and/or to determine the orientation of device 10 relative to item 56 (e.g., to determine when device 10 is being pointed at item 56).

Figure 8:
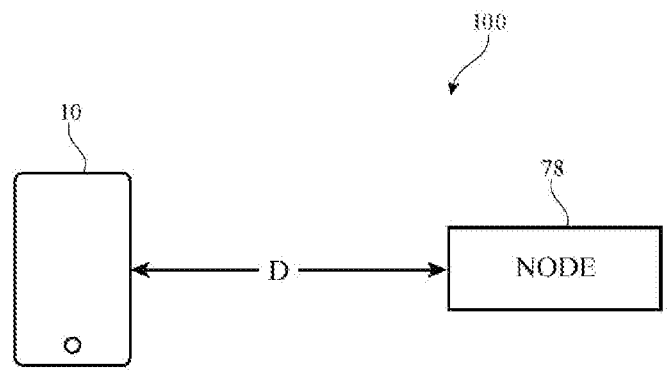
FIG. 8 is a diagram illustrating how a distance between an illustrative electronic device and a node in a network may be determined in accordance with an embodiment.

FIG. 8 shows how device 10 may determine a distance D between device 10 and node 78. In arrangements where node 78 is capable of sending or receiving communications signals (e.g., tagged item 54, electronic equipment 52, or other electronic devices 10' of FIG. 7), control circuitry 22 may determine distance D using communication signals (e.g., signals 58 of FIG. 7). Control circuitry 22 may determine distance D using signal strength measurement schemes (e.g., measuring the signal strength of radio signals from node 78) or using time based measurement schemes such as time of flight measurement techniques, time difference of arrival measurement techniques, angle of arrival measurement techniques, triangulation methods, time-of-flight methods, using a crowdsourced location database, and other suitable measurement techniques. This is merely illustrative, however. If desired, control circuitry 22 may determine distance D using Global Positioning System receiver circuitry 38, using proximity sensors (e.g., infrared proximity sensors or other proximity sensors), using image data from camera 30, motion sensor data from motion sensors 32, and/or using other circuitry in device 10.

In arrangements where node 78 is a passive object that does not send or receive wireless communications signals, control circuitry 22 may determine distance D using proximity sensors (e.g., infrared proximity sensors or other proximity sensors), using image data from camera 30, and/or using other circuitry in device 10. In some arrangements, device 10 may "tag" passive items by recording where passive item 56 is located relative to other items in network 100. By knowing the location of item 56 relative to anchored nodes in network 100 and knowing the location of the anchored nodes relative to device 10, device 10 can determine the distance D between device 10 and node 78.

Figure 9:
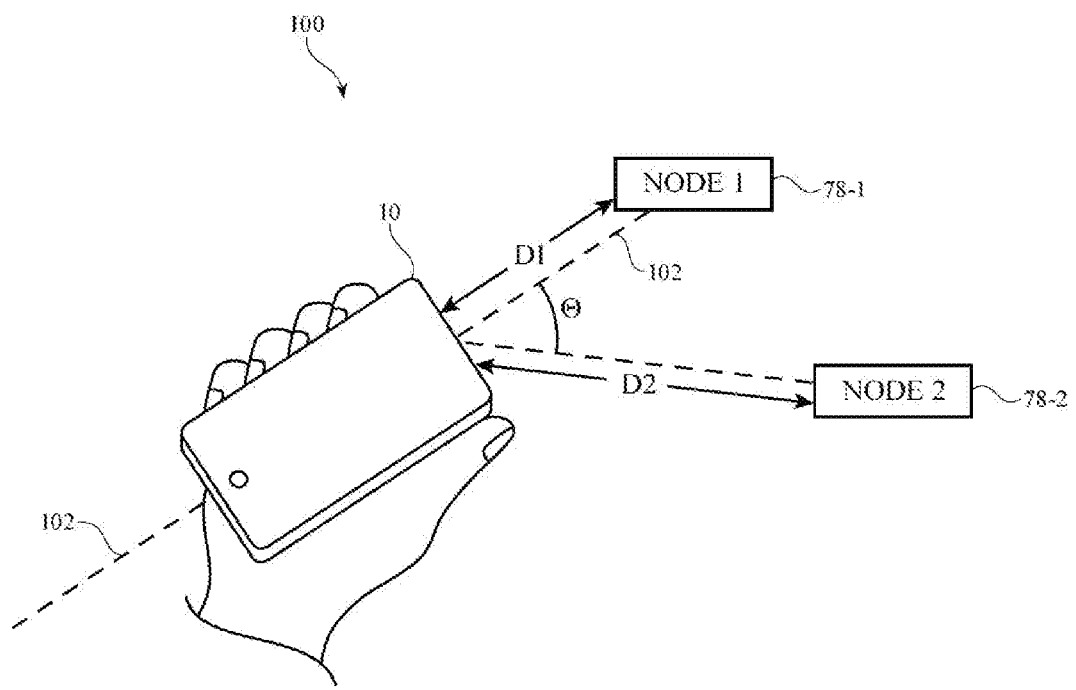
FIG. 9 is a diagram showing how a location and orientation of an illustrative electronic device relative to nodes in a network may be determined in accordance with an embodiment.

In addition to determining the distance between device 10 and nodes 78 in network 100, control circuitry 22 may be configured to determine the orientation of device 10 relative to nodes 78. As shown in FIG. 9, for example, device 10 may have a longitudinal axis such as longitudinal axis 102 that runs lengthwise down the center of device 10. Control circuitry 22 may be configured to determine where nodes 78 are located relative to longitudinal axis 102. For example, control circuitry 22 may determine that a first node such as node 78-1 at distance D1 from device 10 is located within the line of sight of longitudinal axis 102, while a second node such as node 78-2 at distance D2 is located at angle Θ relative to longitudinal axis 102. Control circuitry 22 may determine this type of orientation information using wireless communications signals (e.g., signals 58 of FIG. 7), using proximity sensors (e.g., infrared proximity sensors or other proximity sensors), motion sensor data from motion sensors 32 (e.g., data from an accelerometer, a gyroscope, a compass, or other suitable motion sensor), using image data from camera 30, and/or using other circuitry in device 10.

If desired, other axes may be used to determine the orientation of device 10 relative to other nodes 78. For example, control circuitry 22 may determine where nodes 78 are located relative to a horizontal axis that is perpendicular to longitudinal axis 102. This may be useful in determining when nodes 78 are next to a side portion of device 10 (e.g., for determining when device 10 is oriented side-to-side with one of nodes 78).

After determining the orientation of device 10 relative to nodes 78-1 and 78-2, control circuitry 22 may take suitable action. For example, in response to determining that node 78-1 is in the line of sight of axis 102 (or within a given range of axis 102), control circuitry 22 may send information to node 78-1, may request and/or receive information from 78-1, may use display 14 to display a visual indication of wireless pairing with node 78-1, may use speakers 34 to generate an audio indication of wireless pairing with node 78-1, may use a vibrator or other mechanical element to generate haptic output indicating wireless pairing with node 78-1, and/or may take other suitable action.

In response to determining that node 78-2 is located at angle Θ relative to axis 102, control circuitry 22 may use display 14 to display a visual indication of the location of node 78-2 relative to device 10, may use speakers 34 to generate an audio indication of the location of node 78-2, may use a vibrator or other mechanical element to generate haptic output indicating the location of node 78-2, and/or may take other suitable action.

Figure 10:
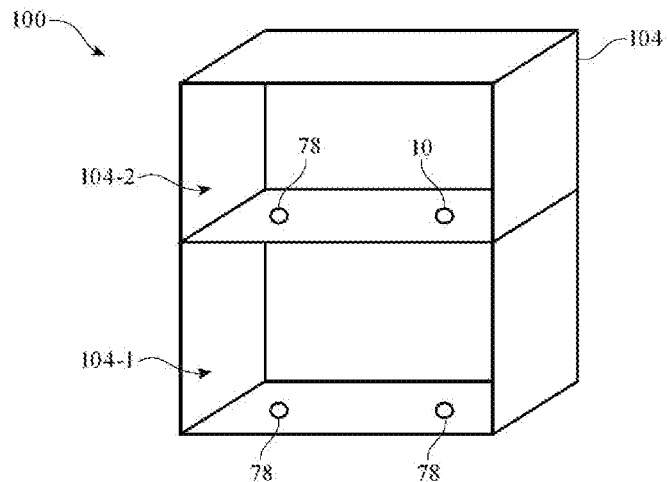
FIG. 10 is a perspective view of an illustrative scene in which the location and orientation of a node relative to other nodes in a network may be determined in accordance with an embodiment.

FIG. 10 illustrates a scenario in which the locations of nodes 78 are determined relative to other nodes 78 in network 100. In this type of scenario, device 10 does not know the absolute location of nodes 78 in network 100. However, control circuitry 22 may determine the relative location of nodes 78 using signal strength measurement schemes (e.g., measuring the signal strength of radio signals from nodes 78) or using time based measurement schemes such as time of flight measurement techniques, time difference of arrival measurement techniques, angle of arrival measurement techniques, triangulation methods, time-of-flight methods, using a crowdsourced location database, and other suitable measurement techniques. For example, device 10 on second floor 104-2 of building 104 may determine that one node 78 is directly below it on first floor 104-1 of building 104 and that another node 78 is located on the same floor as device 10 at a certain distance away.

Figure 11:
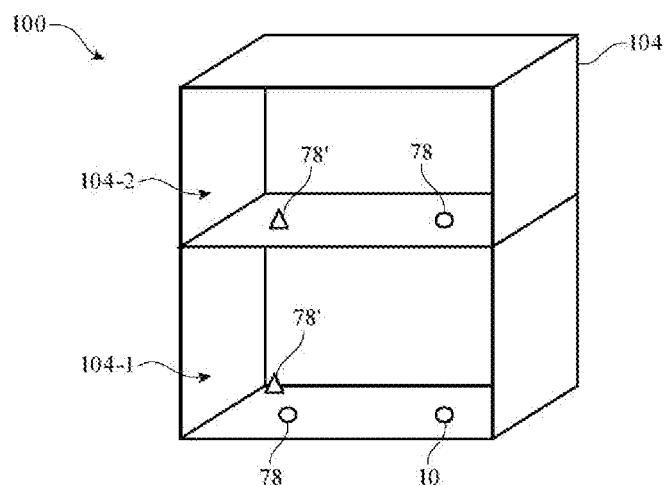
FIG. 11 is a perspective view of an illustrative scene in which the absolute location and orientation of a node may be determined using anchored nodes in a network in accordance with an embodiment.

FIG. 11 illustrates a scenario in which the absolute locations of nodes 78 are determined using anchored nodes 78' in network 100. In this type of arrangement, device 10 knows the locations (e.g., geographic coordinates) of anchored nodes 78' (e.g., a wireless access point, a beacon, or other electronic equipment 52, a tagged item 54 with a known location, etc.) and uses this information to determine the absolute location of nodes 78 (e.g., nodes with unknown locations). Thus, in addition to determining that one of nodes 78 is directly above device 10, control circuitry 22 may determine the absolute location of nodes 78 (e.g., the geographic coordinates of nodes 78).

Control circuitry 22 may use one or more output devices in device 10 to provide information on nearby nodes 78 to a user of device 10. The information may include, for example, how many nodes 78 are nearby, how close nodes 78 are to device 10, where nodes 78 are located in relation to device 10, whether or not a wireless communications link has been or can be established, the type of information that device 10 can send to or receive from nodes 78, and/or other suitable information. Control circuitry 22 may provide this type of information to a user with images on display 14, audio from speakers 34, haptic output from a vibrator or other haptic element, light from a light source such as a status indicator, and/or other output components in device 10.

Figure 12:
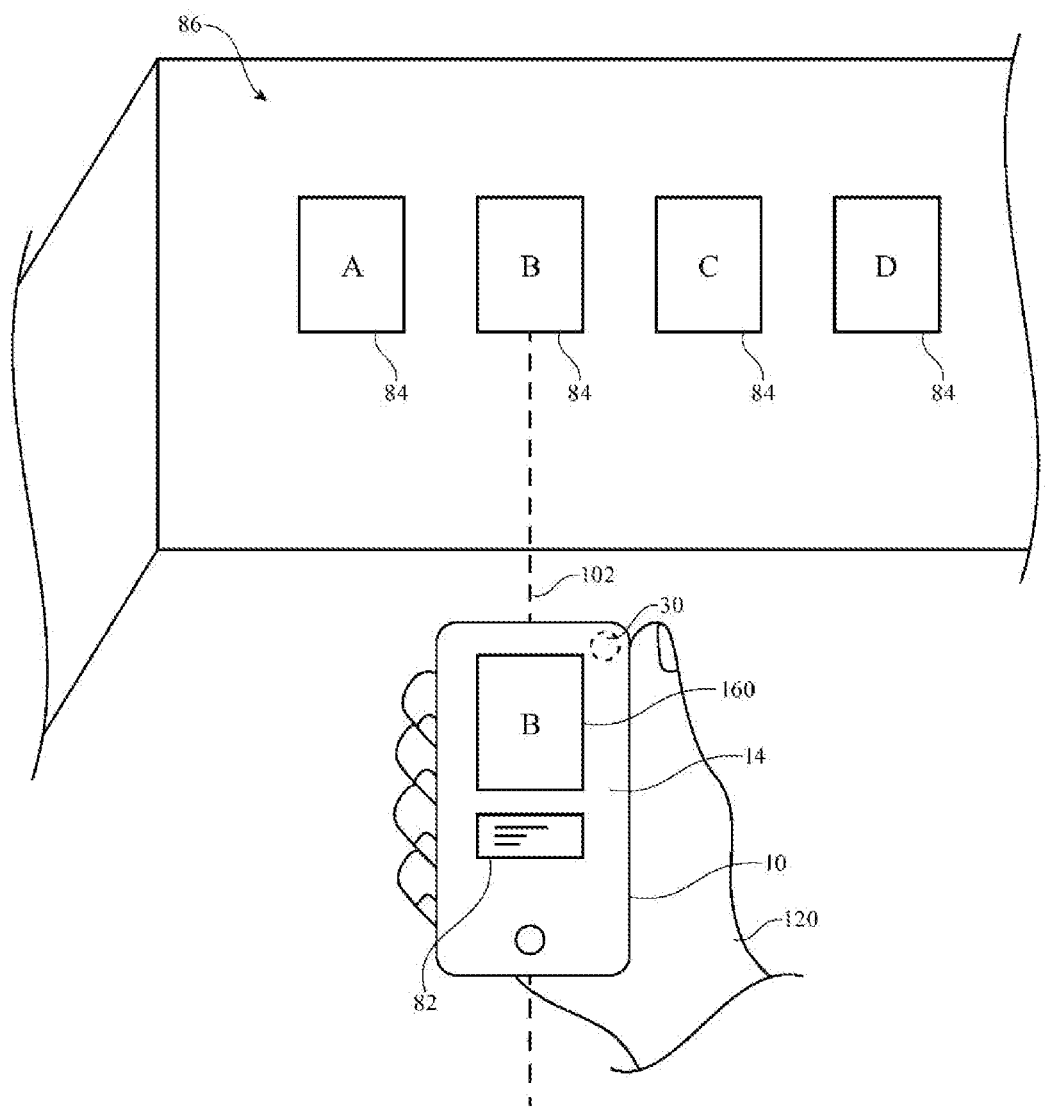
FIG. 12 is a perspective view of an illustrative scene in which an electronic device displays information about an object in response to being pointed at the object in accordance with an embodiment.

FIG. 12 is a perspective view of an illustrative scene 86 in which objects such as objects 84 are located. A user of device 10 such as user 120 may wish to use electronic device 10 to gather information about objects 84 (e.g., objects A, B, C, and D). Objects 84 may be tagged items (e.g., tagged items such as tagged item 54 of FIG. 7) that are capable of sending and/or receiving wireless communications signals, or objects 84 may be passive items (e.g., passive items such as passive item 56 that device 10 recognizes with an image sensor and/or that device has previously assigned coordinates to).

Control circuitry 22 may produce information 82 on display 14 when device 10 comes within a certain distance of one of objects 84 and/or when device 10 is oriented at a given angle with respect to one of objects 84. Control circuitry 22 may, for example, determine the angle between longitudinal axis 102 of device 10 and objects 84. When control circuitry 22 detects that longitudinal axis 102 aligns with one of objects 84 (e.g., when a user points the top end of device 10 at one of objects 84) and that device 10' is within a given distance of object 84 (e.g., 10 feet, 20 feet, 30 feet, 50 feet, more than 50 feet, less than 50 feet, or other threshold range), control circuitry 22 may use display 14 to provide information 82 about object 84.

As shown in the example of FIG. 12, device 10 is pointed at object B and therefore receives corresponding information 82 about object B. Information 82 may be sent from object B to device 10 over a wireless communications link, or information 82 may be stored on device 10 and displayed in response to control circuitry 22 detecting that device 10 is being pointed at object B. As an example, objects 84 may be artworks in an art gallery and information 82 may be information about the artwork that device 10 is pointed at.

If desired, other axes may be used to determine the orientation of device 10 relative to objects 84. For example, control circuitry 22 may determine where objects 84 are located relative to a horizontal axis that runs cross-wise through device 10 (e.g., a side-to-side axis that extends between left and right sides of device 10 and is perpendicular to longitudinal axis 102), a horizontal axis that runs from front-to-back through device 10 (e.g., perpendicular to display 14), or other suitable axis.

Control circuitry may, if desired, measure orientation relative to multiple axes associated with device 10 to adaptively determine how user 120 is using device 10 to interact with other objects. In this way, user 120 may easily switch between a remote-control type pointing (e.g., where the top end of device 10 is pointed towards the target object), a camera-type pointing (e.g., where the rear face of device 10 opposite display 14 is pointed towards the target object), and any other suitable method of pointing device 10 at a target object. If desired, control circuitry 22 may use motion sensor data from motion sensor 32 to determine how device 10 is being held. This information may in turn be used to determine which axis is an appropriate reference for determining the orientation of device 10 relative to objects 84.

A front-to-back horizontal axis that is perpendicular to display 14 may be useful as a reference axis when device 10 is operating in a camera mode and is capturing images with a camera such as rear-facing camera 30. In this type of scenario, a user may be more likely to "point" device 10 at object 84 by pointing rear-facing camera 30 at object 84. Upon determining that device 10 is being pointed at one of objects 84, control circuitry 22 may use display 14 to display information 82 about that object. If desired, information 82 may be overlaid onto an image of object 84 such as image 160. Images such as image 160 may be live images captured by rear-facing camera 30 that are displayed as the images are captured. For example, if a user is pointing at object 84 by aiming camera 30 at object 84, display 14 may display live images 160 captured by camera 30 and may overlay information 82 on images 160.

Figure 13:
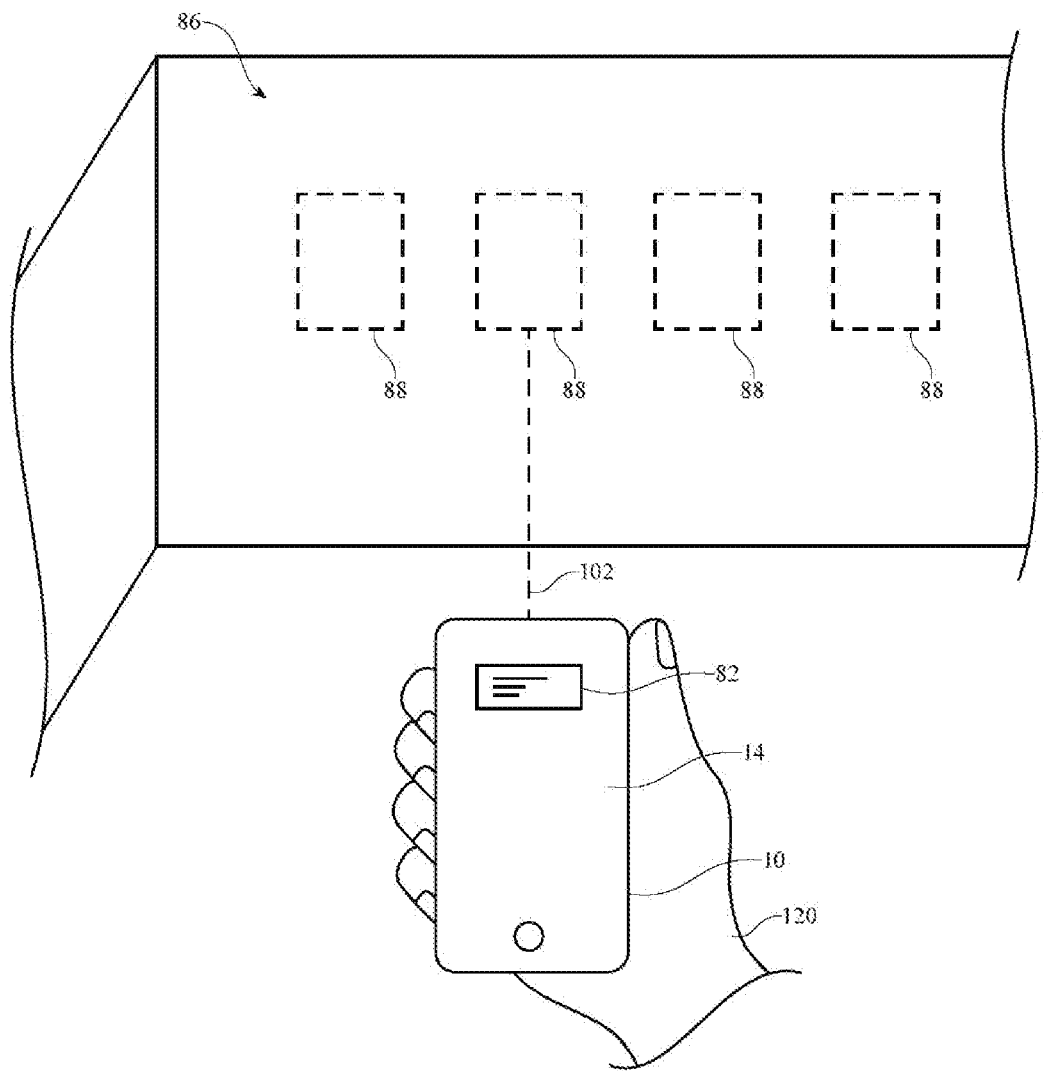
FIG. 13 is a perspective view of an illustrative scene in which an electronic device virtually marks a given space in accordance with an embodiment.

FIG. 13 shows how device 10 may record information 82 for a region in space in scene 86. In particular, if user 120 wants device 10 to display information 82 in response to being pointed at a particular passive item such as an area on a wall (e.g., regions 88 of FIG. 13), user 120 may point device 10 in the direction of target space 88 and may provide input to device 10 that causes device 10 to record and store the location of target item 88. Control circuitry 22 may construct a virtual three-dimensional representation of scene 86 and may assign target spaces 88 three-dimensional coordinates in the virtual space based on their locations relative to device 10. In some arrangements, the virtual three-dimensional space may be anchored by one or more items with a known location (e.g., may be anchored by one or more tagged items 54 having a known location, electronic equipment 52 having a known location, or other items with a known location). Device 10 may record where target areas are located relative to the anchored items.

Device 10 may remember the virtual coordinates of target spaces 88 and may take certain actions when device 10 is in a certain location or orientation relative to areas 88. For example, when device 10 is pointed at a given one of target spaces 88, display 14 may display information 82 associated with that target space. Information 82 may, for example, be stored on device 10 and displayed on display 14 in response to control circuitry 22 detecting that device 10 is being pointed at a given one of target areas 88, or information 82 may be received over a wireless communications link (e.g., over a wireless communications link with another node in network 100 of FIG. 7). Target spaces 88 may be areas that will eventually be occupied by certain objects (e.g., objects 84 of FIG. 12 or other objects). If desired, information 82 that is assigned to spaces 88 may be information on objects that will later occupy spaces 88.

The example of FIG. 13 in which target spaces 88 are virtually marked and assigned information 82 before objects occupy spaces 88 is merely illustrative. If desired, objects may be placed in spaces 88 and then virtually marked and assigned information 82 by device 10.

Figure 14:
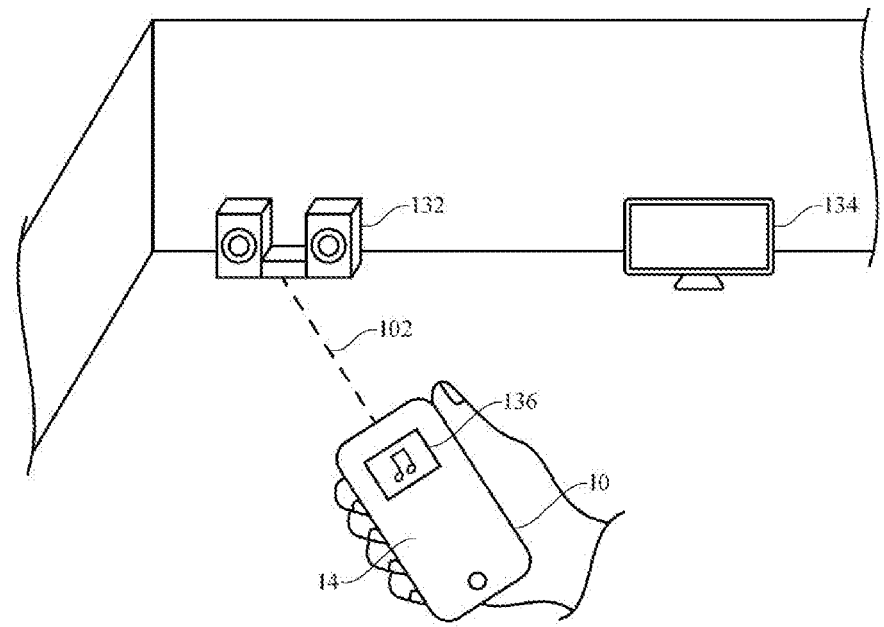
FIG. 14 is a perspective view of an illustrative scene in which an electronic device automatically displays music controls in response to being pointed at a music device in accordance with an embodiment.
Figure 15:
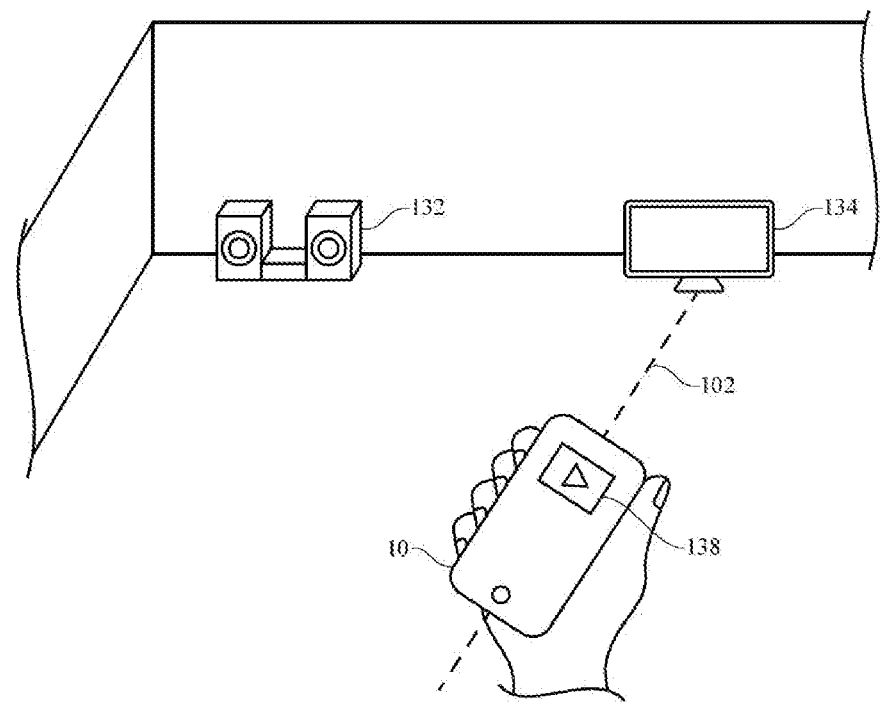
FIG. 15 is a perspective view of an illustrative scene in which an electronic device automatically displays television controls in response to being pointed at a television in accordance with an embodiment.

If desired, location and orientation information may be used to perform remote control functions. As shown in FIGS. 14 and 15, for example, control circuitry 22 may detect whether device 10 is pointed at a first electronic device such as stereo system 132 or a second electronic device such as television 134. Equipment 132 and 134 may be tagged items such as item 54 of FIG. 7 or other electronic equipment such as equipment 52 of FIG. 7. Control circuitry 22 may receive wireless communication signals from equipment 132 and 134 over a wireless communications link (e.g., communications link 58 of FIG. 7). The wireless communications signals may include location information and/or may include identifying information that informs control circuitry 22 of the capabilities of equipment 132 and 134. Based on this information, control circuitry 22 may detect when device 10 is pointed at equipment 132 and 134 and may determine what types of control signals device 10 may be able to send to equipment 132 and 134.

In the example of FIG. 14, control circuitry 22 may detect that longitudinal axis 102 of device 10 is aligned with stereo system 132. In response to determining that device 10 is pointed at stereo system 132, control circuitry 22 may use display 14 to display a set of music controls such as music controls 136. In response to user input to music controls 136, control circuitry 22 may use wireless circuitry 36 to send corresponding control signals to stereo system 132. In the example of FIG. 15, control circuitry 22 may detect that longitudinal axis 102 of device 10 is aligned with television 134. In response to determining that device 10 is pointed at television 134, control circuitry 22 may use display 14 to display a set of television controls such as television controls 138. In response to user input to television controls 138, control circuitry 22 may use wireless circuitry 36 to send corresponding control signals to television 134.

The examples of FIGS. 14 and 15 are merely illustrative. In general, any suitable electronic equipment that is capable of sending and receiving wireless communications signals may be controlled by electronic device 10. Upon determining that electronic device 10 is pointed towards a particular piece of electronic equipment, control circuitry 22 may use display 14 to display the appropriate control icons for that piece of electronic equipment. Control circuitry 22 may determine the type of electronic equipment by exchanging information with the electronic equipment over a wireless communications link. Based on this information, control circuitry 22 may determine which types of control icons are appropriate for allowing the user to control that piece of electronic equipment.

Devices that device 10 remotely controls may be active devices (e.g., active devices such as tagged item 154, electronic equipment 52, or other electronic devices 10') so that the devices can receive wireless control signals from device 10.

Figure 16:
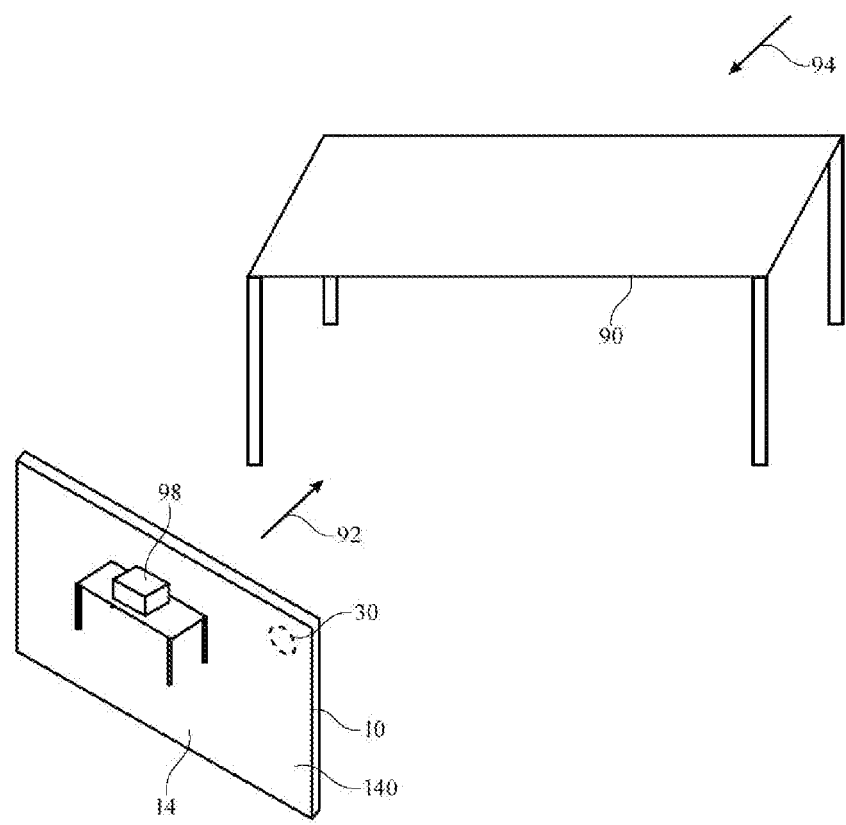
FIG. 16 is a perspective view of a scene in which an electronic device displays a virtual object on a real world scene in accordance with an embodiment.

The position and orientation of device 10 relative to other objects in the vicinity of device 10 may also be used enhance augmented reality and/or virtual reality applications that run on device 10. Consider a scenario in which virtual objects are displayed on display 14. It may be desirable to overlay the virtual objects onto a real world scene or to tie the virtual objects to real world objects in the vicinity of device 10. FIG. 16 shows an example in which device 10 is being used to view virtual objects on display 14. In this example, display 14 of device 10 displays images 140 including a live camera view of images captured by camera 30. Display 14 may overlay virtual objects such as virtual object 98 onto images 140.

Using the location and orientation of device 10 relative to objects in the vicinity of device 10 such as table 90, control circuitry 22 may adjust how virtual object 98 is displayed on display 14 to match how object 98 would realistically look from the user's perspective if it were actually resting on table 90. For example, control circuitry 22 may display a first side of object 98 on table 90 when camera 30 is viewing table 90 in direction 92. If the user were to walk to an opposing side of table 90 and use camera 30 to view table 90 in direction 94, control circuitry 22 would adjust the appearance of object 98 so that display 14 displayed the opposing side of object 98. In this way, a user may walk completely around table 90 and view virtual object 98 from 360 degrees.

Figure 17:
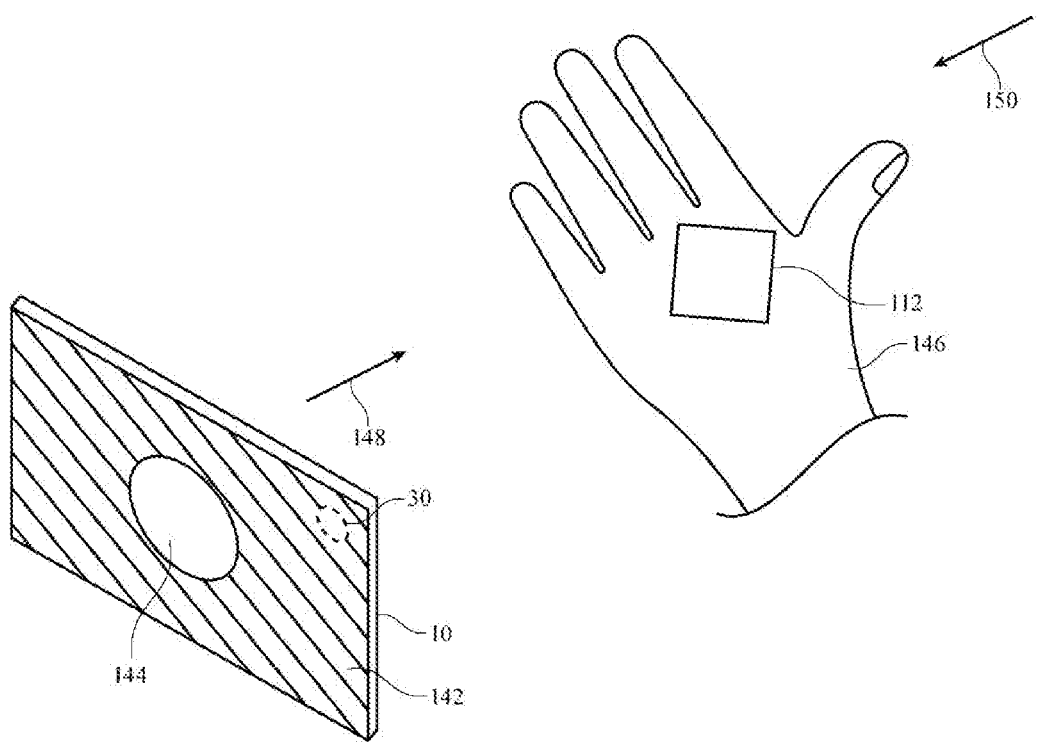
FIG. 17 is a perspective view of a scene in which a display overlays a virtual world object onto a real world object in accordance with an embodiment.

In the example of FIG. 16, virtual object 98 is tied to a particular location in three-dimensional space. In other words, device 10 may "see" the object at that particular location regardless of what other physical objects may actually be present at that location. In some arrangements, virtual objects may be tied to a particular object rather than a particular location. This type of arrangement is illustrated in FIG. 17. Control circuitry 22 may assign a virtual object such as virtual object 144 to a real world object such as real world object 112. Real world object 112 may, for example, be a tagged item such as tagged item 54 of FIG. 7 that can send and/or receive wireless signals (e.g., signals 58 of FIG. 7). Control circuitry 22 may determine the location of object 112 relative to device 10 based at least partially on the wireless signals exchanged between device 10 and object 112.

As with the example of FIG. 16, control circuitry 22 may use the location and orientation of device 10 relative to object 112 to adjust how virtual object 114 is displayed on display 14 to match how object 144 would realistically look from the user's perspective if it were actually resting on hand 146. For example, control circuitry 22 may display a first side of object 144 on hand 146 when camera 30 is viewing object 112 in direction 148. If the user were to walk to an opposing side of object 112 and use camera 30 to view object 112 in direction 150, control circuitry 22 would adjust the appearance (e.g., the perspective) of object 144 on display 14 to display the opposing side of object 144. Since object 112 may itself be moveable, control circuitry 22 may also adjust the perspective of object 144 in response to movement of object 112 relative to device 10.

Object 144 may be displayed on a background such as background 142. Background 142 may be a live image from camera 30 (e.g., a live image including an image of hand 146 with virtual object 144 overlaid on object 112), background 142 may be a virtual reality background, or background 142 may be any other suitable background.

The foregoing is merely illustrative and various modifications can be made to the described embodiments. The foregoing embodiments may be implemented individually or in any combination.

What is claimed is:
1. An electronic device, comprising:
   wireless communications circuitry including an ultra-wideband transceiver that exchanges ultra-wideband radio frequency signals with an external electronic device having a speaker;
   control circuitry that:

determines when a distance between the electronic device and the external electronic device is within a threshold distance based on the ultra-wideband radio frequency signals;

determines whether the electronic device is pointed towards the external electronic device based on an angle of arrival of the ultra-wideband radio frequency signals; and requests and receives information from the external electronic device in response to determining that the distance is less than the threshold distance and that the electronic device is pointed towards the external electronic device; and a display that automatically displays the information and control icons for the speaker in response to determining that the distance is less than the threshold distance and that the electronic device is pointed towards the external electronic device.

2. The electronic device defined in claim 1 further comprising a haptic output device that provides haptic output when the electronic device is within the threshold distance of the external electronic device.

3. The electronic device defined in claim 2 wherein the control circuitry tracks a position of the external electronic device based on the ultra-wideband radio frequency signals and adjusts the haptic output from the haptic output device based on the position of the external electronic device.

4. The electronic device defined in claim 1 wherein the display is touch-sensitive and wherein the control circuitry sends control signals to the external electronic device in response to touch input on the control icons.

5. The electronic device defined in claim 1 wherein the control circuitry receives the information from the external electronic device via the ultra-wideband radio frequency signals.

6. The electronic device defined in claim 5 wherein the control circuitry determines a type of control icon to display based on the information received from the external electronic device.

7. The electronic device defined in claim 1 wherein the control circuitry determines a time-of-flight associated with the ultra-wideband radio frequency signals.

8. An electronic device, comprising:
wireless communications circuitry including an ultra-wideband transceiver that exchanges ultra-wideband radio frequency signals with an external electronic device;
control circuitry that:
determines an angle of arrival of the ultra-wideband radio frequency signals and determines a distance to the external electronic device based on the ultra-wideband radio frequency signals; and
requests and receives information from the external electronic device in response to determining that the distance is less than a first threshold and that the angle of arrival is less than a second threshold;
a display that automatically displays the information and control icons for the external electronic device in response to determining that the distance is less than a first threshold and that the angle of arrival is less than a second threshold; and
a haptic output device that provides haptic output, wherein the control circuitry adjusts the haptic output based on the distance to the external electronic device.

9. The electronic device defined in claim 8 wherein the control circuitry determines whether the electronic device is pointing towards the external electronic device based on the angle of arrival of the ultra-wideband radio frequency signals.

10. The electronic device defined in claim 8 wherein the external electronic device comprises a speaker and the control icons comprise speaker control icons.

11. The electronic device defined in claim 10 wherein the control circuitry sends control signals to the speaker in response to user input on the speaker control icons.

12. An electronic device, comprising:
wireless communications circuitry including an ultra-wideband transceiver that receives ultra-wideband radio frequency signals;
control circuitry that:
determines whether a pointing direction of the electronic device is closer to a first external electronic device or a second external electronic device based on an angle of arrival of the ultra-wideband radio frequency signals; and
requests and receives information from the first external electronic device in response to determining that the pointing direction of the electronic device is closer to the first external electronic device than the second external electronic device; and
a display that displays the information and a first control icon for controlling the first external electronic device without displaying a second control icon for controlling the second external electronic device in response to determining that the pointing direction of the electronic device is closer to the first external electronic device than the second external electronic device.

13. The electronic device defined in claim 12 wherein the control circuitry determines a distance to the first external electronic device based on the ultra-wideband radio frequency signals.

14. The electronic device defined in claim 13 further comprising a haptic output device that provides haptic output, wherein the control circuitry adjusts the haptic output based on the distance to the first external electronic device.

15. The electronic device defined in claim 12 wherein the first external electronic device comprises a speaker and wherein the first control icon comprises a speaker control icon.

16. The electronic device defined in claim 12 wherein the control circuitry sends control signals to the first external electronic device in response to receiving user input on the first control icon on the display.

* * * * *